Feb. 6, 1951     W. B. GASPER     2,540,440
RELIEF VALVE
Filed Jan. 9, 1945
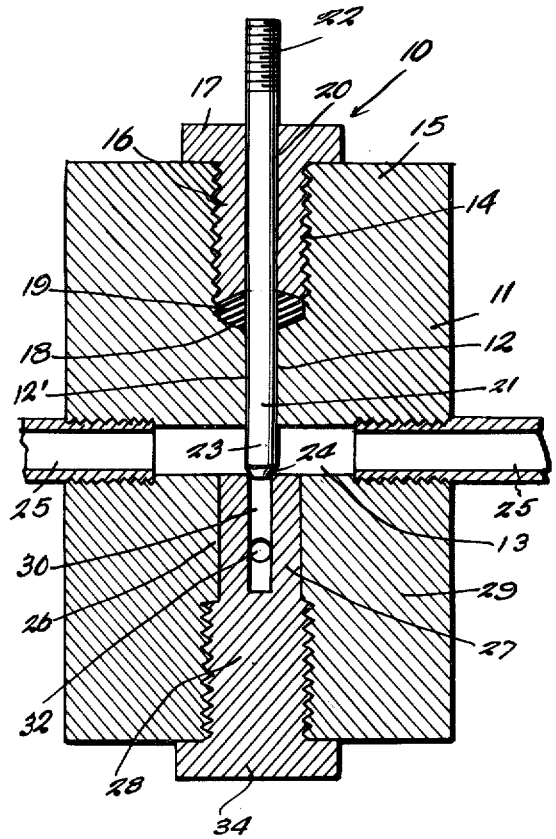
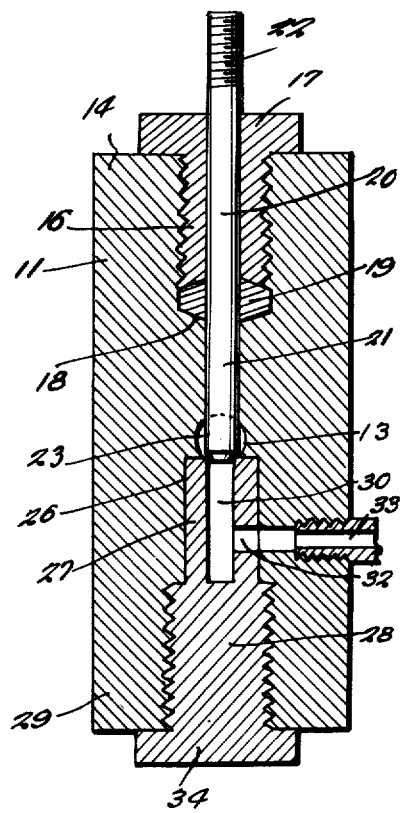
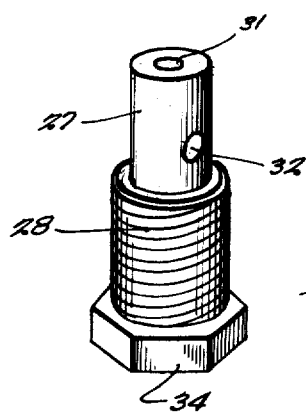
Inventor
William B. Gasper Patented Feb. 6, 1951

2,540,440

UNITED STATES PATENT OFFICE 2,540,440

RELIEF VALVE

William B. Gasper, Dayton, Ohio, assignor to Simonds, Worden White Co., Dayton, Ohio, a corporation of Ohio Application January 9, 1945, Serial No. 572,038

1 Claim. (Cl. 277—66)

This invention relates to valve structures and has for its object to provide a pressure relief valve suitable for both high and low hydraulic systems.

Another object is to provide a hydraulic valve of a nature to relieve line pressure above 5000 p. s. i. in a hydraulic system.

A further object of the invention is to provide a relief valve formed to permit pressure build up to a desired pressure and means whereby the pressure may be relieved when pressure goes beyond a desired p. s. i.

Other features and advantages will become more readily apparent from the following description and the accompanying illustrative drawings in which:

Figure 1 is a vertical sectional view of my valve,

Figure 2 is a sectional view taken on line 2—2 thereof, and

Figure 3 is a detail perspective view of a relief member.

In the accompanying drawings as above enumerated and in the following specification, like characters of reference indicate like parts throughout and in which 10 represents my valve which consists of a body block 11, provided with a vertical bore 12, extending therethrough and a transverse bore 13 extending therethrough and bisecting the first bore. The bore 12 is enlarged as at 14, at the upper end 15 of the block 11, and is internally screw threaded to receive the threaded plug 16, terminating at its upper end in a hex cap 17. Upon the seat 18, formed by the enlargement of bore 14, is a packing 19, upon which plug 16 bears. Extending vertically through the plug 16 is a bore 20, of a common diameter to that of the reduced bore portion 12', through which bores 12' and 20, a stem 21 is slidably seated. The upper outer end 22 of this stem is screw threaded for connection to any device for operating the same. The lower end 23 terminates in a valve member 24. The diameter of the bore 13 is sufficiently greater than that of stem 23, to permit free passage of fluid through the pipe line 25, in either direction.

The bore 12 is enlarged at 26, to receive the reduced smooth plug end 27, of an enlarged screw plug 28, which is threaded into the lower end 29 of block 11. The member 27 is provided with a reduced vertical bore 30, terminating at the bore 13, at its upper end 31, which upper end forms a seat for the valve member 24. A transverse bore 32, in member 27, connects with bore 30, and with a second channel in the block leading to the pressure relief line 33. The member 28 is provided with a hex head 34 and by rotatively adjusting said member, the transverse bore 32 may be rotated out of alignment with the line 33 when it is desired to make the valve inoperative.

To clearly describe the operation, and use of my improved valve, it is to be connected in a pipe line, running from a hydraulic pump, to a hydraulic press, containing a ram, such press may be positioned so the ram operates vertically.

The valve body 11 is connected in a pipe line by threaded ends of bore 13, forming a continuous passage for pressure mediums, from a hydraulic pump to a hydraulic press (not shown).

Threaded end of the second chamber in the body 11 forming an extension of bore 32 is connected to a relief pipe line, leading from valve body 11, to the reservoir side of pump; also a pressure gauge (not shown) is connected to the pressure line between valve body 11, and the hydraulic press, such a gauge is to indicate the amount of pressure that is built up in said line and system. The said gauge indicates pounds per square inch. For example, it is necessary to apply more pressure on products with a large area than a product with a smaller area.

To compress a sheet of wood, for instance, on a hydraulic press, the wood is placed on top of the exposed end of ram between the ram and the head or top of said press. To apply given pounds per square inch pressure, the ram must move toward the head of the press, being forced to move by pressure medium supplied by the hydraulic pump. When the ram has traveled upward so there is contact between the wood and the ram, and also contact between the wood and the head of the press, then the wood begins to compress. With my improved valve this operation and any similar ones can be performed consistently.

To manually operate said valve a lever is connected to the upper end 22, of stem 21, to raise and lower stem 21. When said lever is operated to lower the stem 21, it causes the stem to travel toward the seat 31, in valve member 27, until stem 21, seats and closes the terminated end of relief bore 30, allowing passage for pressure medium through bore 13, from pump to press, causing the ram to travel upward toward the head of the press. When this stage is reached the wood begins to compress and pressure begins to build up in the system. When the desired pressure is indicated by the gauge, the pressure build up must be stopped quickly so the wood will not be compressed beyond the desired stage. Pressure build up is stopped by operating the lever to cause stem 21, to travel upward and away from seat 31, opening the terminated end of bore 30, allowing the pressure medium to flow from pump back to the reservoir. This makes it possible for pressure medium to return from hydraulic press through bores 13 and 30, through the relief line, allowing the contained ram to recede. The valve lever is held in this position until the press is reloaded.

The above explanation has reference to manual operation. However, any source of energy may be used to operate the valve, such as air cylinders, electrical devices, et cetera, being separate units which may be installed additionally to operate said valve. Said improved valve may be used on any hydraulic system requiring such means of control.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A relief valve comprising a block having a channel extending therethrough and terminally adapted for connection to a pressurized line, said block having a first bore communicating with said channel, a screw plug in said first bore, a second channel in said block leading from the exterior of the block to said first bore, said screw plug having a bore connecting said second channel with the first-mentioned channel, a valve plunger, a gland nut mounted in said block, said plunger being slidably mounted in said gland nut and being coaxially arranged with reference to said plug and extending into the block from the side of the block opposite said plug, said screw plug having a reduced diameter inner portion extending to the first-mentioned channel, a seat for said plunger in the inner end of said bore in the screw plug, said last-mentioned bore being in part axial of said plunger and in part transverse, and said second channel in the block communicating directly with said transverse part so that the bore in the screw plug can be closed by rotatively adjusting the screw plug when it is desired to make the relief valve temporarily inoperative as such.

WILLIAM B. GASPER.

REFERENCES CITED

The following references are of record in the file of this patent:

UNITED STATES PATENTS

| Number | Name | Date |
|---|---|---|
| 1,091,762 | Phelps | Mar. 31, 1914 |
| 1,427,600 | Justus | Aug. 29, 1922 |
| 1,493,121 | McAneny | May 6, 1924 |
| 1,535,406 | Eynon | Apr. 28, 1925 |
| 1,583,814 | Till | May 11, 1926 |
| 1,937,666 | Olson | Dec. 5, 1933 |
| 2,059,759 | Stearns | Nov. 3, 1936 |

FOREIGN PATENTS

| Number | Name | Date |
|---|---|---|
| 716 | Great Britain | of 1913 |
| 35,213 | France | of 1929 |